US012802427B2

(12) United States Patent
Abernot et al.

(10) Patent No.: US 12,802,427 B2
(45) Date of Patent: Nov. 17, 2026

(54) PATTERN LEARNING AND RECOGNITION DEVICE AND ASSOCIATED SYSTEM AND METHOD

(71) Applicants: CENTRE NATIONAL DE LA RECHERCHE SCIENTIFIQUE, Paris (FR); UNIVERSITE DE MONTPELLIER, Montpellier (FR)

(72) Inventors: Madeleine Abernot, Montpellier (FR); Thierry Gil, Saint Gely du Fesc (FR); Aida Todri-Sanial, Prades-le-Lez (FR)

(73) Assignees: CENTRE NATIONAL DE LA RECHERCHE SCIENTIFIQUE, Paris (FR); UNIVERSITE DE MONTPELLIER, Montpellier (FR)

( * ) Notice: Subject to any disclaimer, the term of this patent is extended or adjusted under 35 U.S.C. 154(b) by 295 days.

(21) Appl. No.: 18/292,786

(22) PCT Filed: Jul. 27, 2022

(86) PCT No.: PCT/EP2022/071045
§ 371 (c)(1),
(2) Date: Jan. 26, 2024

(87) PCT Pub. No.: WO2023/006805
PCT Pub. Date: Feb. 2, 2023

(65) Prior Publication Data

US 2025/0086955 A1 Mar. 13, 2025

(30) Foreign Application Priority Data

Jul. 28, 2021 (EP) .................................... 21306049

(51) Int. Cl.
*G06V 10/82* (2022.01)
*G06V 10/774* (2022.01)

(52) U.S. Cl.
CPC ............ *G06V 10/82* (2022.01); *G06V 10/774* (2022.01)

(58) Field of Classification Search
CPC .... G06V 10/82; G06V 10/774; G06V 10/955; G06V 10/20; G06V 10/32; G06V 10/40;
(Continued)

(56) References Cited

U.S. PATENT DOCUMENTS 7,280,989 B1 * 10/2007 Hoppensteadt ........ G06V 10/40 706/26
11,164,068 B1 * 11/2021 Karg ...................... G06N 3/065
(Continued)

FOREIGN PATENT DOCUMENTS

CA 2642041 A1 * 6/2007 ........... G06V 10/451
CN 109544485 A * 3/2019 ............. H03L 7/099
(Continued)

OTHER PUBLICATIONS

Velichko, Andrei et al., A Model of an Oscillatory Neural Network with Multilevel Neurons for Pattern Recognition and Computing, Electronics (2019), pp. 1-52. https://doi.org/10.3390/electronics8010075 (Year: 2019).*

(Continued)

*Primary Examiner* — Jose L Couso
(74) *Attorney, Agent, or Firm* — HAUPTMAN HAM, LLP

(57) ABSTRACT

A pattern learning and recognition device including a training unit adapted to train an oscillatory neural network, the training unit being a part of a processor, an oscillatory neural network unit, the oscillatory neural network unit implementing a trained oscillatory neural network being adapted to output a pattern when an image is inputted, the oscillatory neural network unit being a part of a programmable architecture, and a controlling unit adapted to control the oscil- (Continued)

latory neural network unit and the training unit, the controlling unit being another part of the programmable architecture, the processor and the programmable architecture forming a system-on-chip.

13 Claims, 1 Drawing Sheet

(58) Field of Classification Search
CPC .. G06V 10/454; G06V 10/764; G06V 40/168; G06V 40/171; G06V 40/172; G06V 10/54; G06V 10/7764; G06V 10/84; G06V 20/41; G06V 30/18057; G06V 20/698; G06V 30/19173; G06V 30/194; G06N 3/063; G06N 3/02; G06N 3/08–088; G06N 3/04; G06N 3/0445; G06N 3/0454; G06N 3/0464; G06N 3/4046; G06N 3/4053; G06N 3/049; G06N 3/0499; G06N 7/00; G06N 7/01; G06N 20/00; G06F 18/00; G06F 18/2431; G06F 18/213; G06F 18/214; G06F 18/22; G06F 18/241; G06F 18/24; G06F 18/2411; G06F 18/2415; G06F 18/253; G06F 30/27; G06T 3/4046; G06T 5/60; G06T 9/002; G06T 2207/20076; G06T 2207/20081; G06T 2207/20084; G06T 2211/441; G06K 7/1482; Y10S 128/925
See application file for complete search history.

(56) References Cited

U.S. PATENT DOCUMENTS

| | | | | |
|---|---|---|---|---|
| 2016/0328647 | A1* | 11/2016 | Lin | G06F 17/11 |
| 2017/0236027 | A1* | 8/2017 | van der Made | G06V 10/82 382/158 |
| 2019/0122095 | A1* | 4/2019 | Karg | G06N 3/04 |
| 2020/0074268 | A1* | 3/2020 | Nikonov | H03K 3/0315 |
| 2020/0104699 | A1 | 4/2020 | Zhou et al. | |
| 2021/0242831 | A1* | 8/2021 | Lashkare | H03B 1/02 |
| 2021/0271960 | A1* | 9/2021 | Raha | G06F 7/5443 |
| 2022/0004876 | A1* | 1/2022 | Karg | G06N 3/063 |
| 2022/0406392 | A1* | 12/2022 | Wang | G11C 27/024 |
| 2024/0305533 | A1* | 9/2024 | Bai | H04W 24/02 |
| 2024/0323657 | A1* | 9/2024 | Yang | G06Q 10/063 |

FOREIGN PATENT DOCUMENTS

| | | | | | |
|---|---|---|---|---|---|
| GB | 2239972 | A | * | 7/1991 | G06N 3/049 |
| RU | 2697947 | C1 | * | 8/2019 | G06N 3/049 |
| RU | 2709168 | C1 | * | 12/2019 | G06F 18/24 |

OTHER PUBLICATIONS

Zhang, Ting et al., “An oscillatory neural network based local processing unit for pattern recognition applications”, Electronics, 2019, pp. 1-13. https://doi.org/10.3390/electronics8010064 (Year: 2019).*

Abernot, Madeleine et al., “Digital Implementation of Oscillatory Neural Network for Image Recognition Applications”, Frontiers in Neuroscience, Aug. 25, 2021, Sec. Neuromorphic Engineering, vol. 15, 2021, pp. 1-16. https://doi.org/10.3389/fnins.2021.713054 (Year: 2021).*

Delacour Corentin et al, “Oscillatory Neural Networks for Edge AI Computing”, 2021 IEEE Computer Society Annual Symposium On VLSI (ISVLSI), IEEE, Jul. 7, 2021, pp. 326-331.

Jackson Thomas C et al, “Oscillatory Neural Networks Based on TMO Nano-Oscillators and Multi-Level RRAM Cells”, IEEE Journal on Emerging and Selected Topics in Circuits and Systems, IEEE, Piscataway, NJ, USA, vol. 5, No. 2, Jun. 2015, pages 230-241.

International Search Report and Written Opinion issued in corresponding International Application No. PCT/EP2022/071045, dated Nov. 16, 2022, pp. 1-9, European Patent Office, Rijswijk, Netherlands.

* cited by examiner

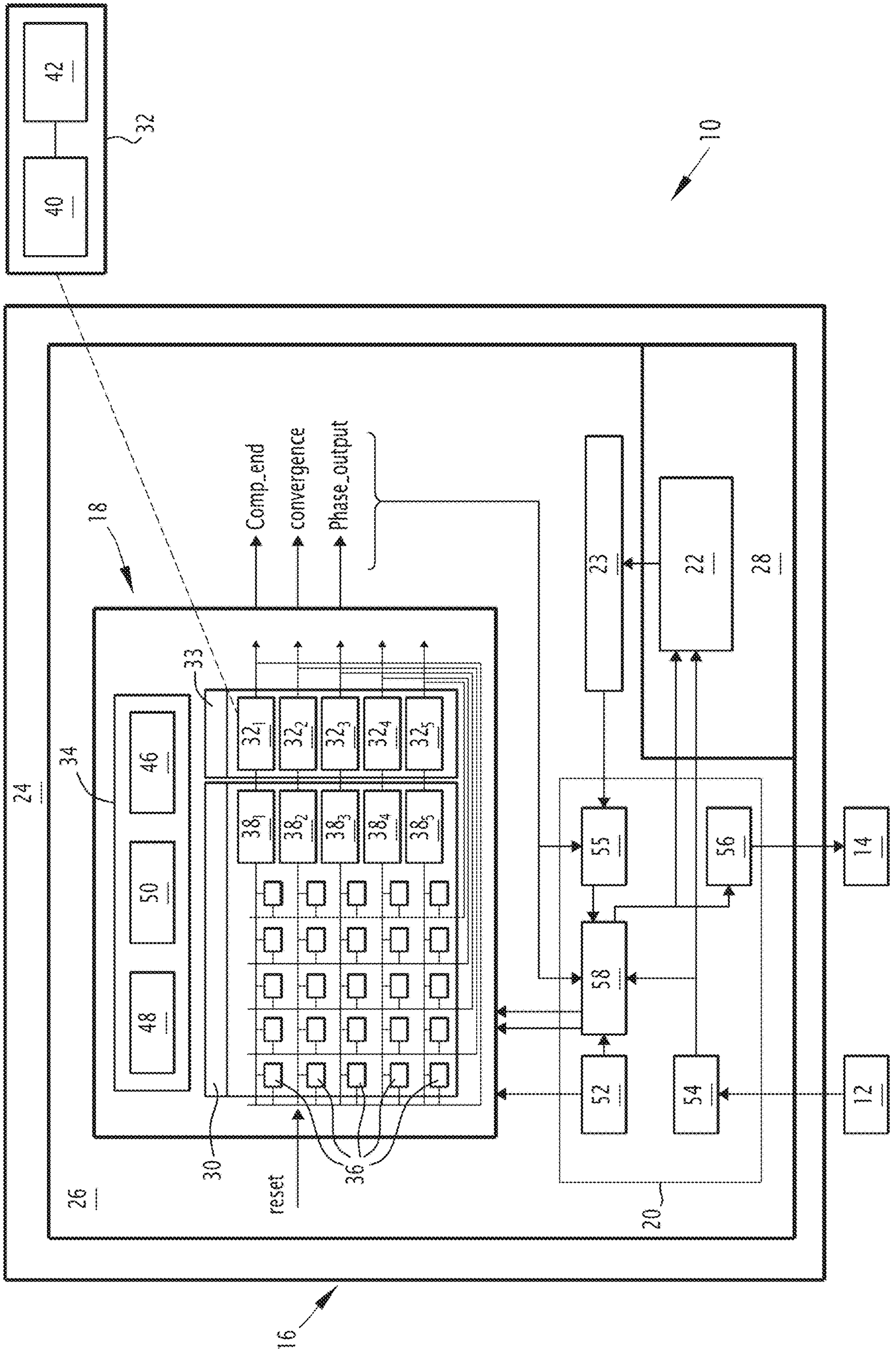
42
40
32
10
Comp_end
convergence
Phase_output
18
33
$32_1$
$32_2$
$32_3$
$32_4$
$32_5$
$38_1$
$38_2$
$38_3$
$38_4$
$38_5$
34
46
50
48
24
23
22
28
55
56
58
52
54
14
12
30
reset
36
26
20
16

PATTERN LEARNING AND RECOGNITION DEVICE AND ASSOCIATED SYSTEM AND METHOD

The present application is a U.S. National Phase of International Application Number PCT/EP2022/071045, filed Jul. 27, 2022, which claims priority to European Application No. 21306049.4, filed Jul. 28, 2021.

TECHNICAL FIELD OF THE INVENTION

The present invention concerns a pattern learning and recognition device. The present invention also deals with a system comprising such pattern learning and recognition device and a method for performing online learning and recognizing a pattern in an image.

BACKGROUND OF THE INVENTION

Pattern recognition is the automated recognition of patterns and regularities in data. Pattern recognition has applications in many areas such medicine with analysis of the presence of tumorous cells in an image, transport notably for identifying elements in the environment or security with fingerprint recognition.

Pattern recognition is generally categorized according to the type of learning procedure used to generate the output value.

Supervised learning assumes that a set of training data (the training set) has been provided, consisting of a set of instances that have been properly labeled by hand with the correct output. A learning procedure then generates a model that attempts to meet two sometimes conflicting objectives: perform as well as possible on the training data, and generalize as well as possible to new data.

Unsupervised learning, on the other hand, assumes training data that has not been hand-labeled, and attempts to find inherent patterns in the data that can then be used to determine the correct output value for new data instances.

A combination of the two that has recently been explored is semi-supervised learning, which uses a combination of labeled and unlabeled data (typically a small set of labeled data combined with a large amount of unlabeled data). Note that in cases of unsupervised learning, there may be no training data at all to speak of; in other words, the data to be labeled is the training data.

Due to the large amount of data required and thus calculation, the physical implementation of the previously mentioned methods requests more and more calculation units.

One way to fabricate such calculation units is to use a CMOS (Complementary metal-oxide-semiconductor) implementation.

Indeed, innovations in CMOS technology and the continuous scaling roadmap of transistors outlined by Moore's prediction has enabled today's powerful computers and handheld devices. Mere miniaturization of devices was initially sufficient to reduce the area and power requirements of transistors, yet for sub-100 nanometers (nm) technology nodes, this was not enough. Two main paths were taken 1) to change the device materials to reduce its parasitics, and 2) change the device geometry for better channel control. First, the metal gates and high-K oxides were introduced to improve the transistor performance. Such material level improvement eventually led to a structural change and the introduction of new gate geometry such as fin field-effect transistors (FinFET). FinFETs allowed controlling the channel from three sides. Recently, TMSC has announced volume production as of 2020 of its 5 nm gate-all-around FinFET transistors made available by EUV process technology and with a target to start production of 3 nm node by 2022.

Nevertheless, despite the advancements in the transistor device and fabrication technologies, CMOS is facing physical barriers—as scaling is approaching a fundamental physical limit with the transistor channel length becoming comparable to the size of a handful of atoms. Such channel lengths lead to significant leakage currents and suffer from lower yield due to high process variations. Consequently, this would translate to more power consumption and more expensive chips, that would be an overkill to what Moore's law has been promising so far. At this point, the scientific and industrial community has focused on developing novel devices that go beyond CMOS transistors. Emerging memories such as magnetic and phase change (PCRAM, RRAM, STT-RAM), and new transistor technologies such as tunnel, negative capacitance and 1D/2D channel material (TFET, NC-FET, CNT-FET/$MOS_2$-FET) are being investigated as potential solutions to extend the performance and capacity of Von Neumann computing paradigm.

Despite the on-going research on novel device geometries and channel materials, there is a tremendous effort on exploring innovative non-Von Neumann computing architectures to meet the requirements of data-centric applications. In the classical von Neuman architecture, data moves from memory to the processor, which for processing large datasets becomes infeasible as a large amount of power is consumed in data movement, hence, arises the memory-wall problem. This problem is exacerbated for pattern recognition.

Non-Von Neumann architectures like brain-inspired architectures based on neural networks have drawn a lot of interest as more understanding of how the brain and neurons work is gained. Neural networks aim to mimic the parallelism of the brain and their implementation in resource-intensive hardware such as GPUs have revolutionized AI applications. For example, current CMOS implementations of neural networks such as Google's Tensor Processing Unit can offer up 86X more computations per watt. Even though these systems are more power-efficient compared to a CPU due to their architecture, the CMOS implementations of neural networks will eventually face the problems as described earlier.

Neuromorphic hardware appears to be the solution to go beyond Von Neuman architecture. These systems are based on brain architecture with artificial neural networks made of synapses and neurons. Many artificial neural network algorithms for machine learning are already used on software, such as spiking neural networks, convolutional neural networks, hopfield neural networks. Their integration into hardware appeared in the last decade and revolutionized the world of artificial intelligence by enabling parallel architecture.

An alternative computing approach based on artificial neural networks uses oscillators to compute or oscillatory neural networks. Such an approach differs from classical CMOS and classical von Neumann where building blocks are analog and perform computations efficiently. Moreover, data is encoded on the oscillator signals phase, which is a departure from the classical voltage level-based data encoding (such as amplitude voltage to represent a logical bit '1' or '0'). Oscillatory neural networks can perform computations efficiently and can be used to build a more extensive neuromorphic system.

SUMMARY OF THE INVENTION

There is therefore a need for an efficient implementation of a pattern recognition device based on oscillatory neural networks.

To the end, the specification describes a pattern learning and recognition device comprising a training unit adapted to train an oscillatory neural network, the training unit being a part of a processor. The pattern learning and recognition device further comprises an oscillatory neural network unit, the oscillatory neural network unit implementing a trained oscillatory neural network being adapted to output a pattern when an image is inputted, the oscillatory neural network unit being a part of a programmable architecture. The pattern learning and recognition device also comprises a controlling unit adapted to control the oscillatory neural network unit and the training unit, the controlling unit being another part of the programmable architecture, the processor and the programmable architecture forming a system-on-chip.

According to further aspects of this pattern learning and recognition device, which are advantageous but not compulsory, the pattern learning and recognition device might incorporate one or several of the following features, taken in any technically admissible combination:

- the oscillatory neural network unit comprises neuron blocks, each neuron block implementing a respective neuron of the oscillatory neural network, a synapse block, the synapse block being a set of memories and interconnection circuits, each memory storing a respective weight and the interconnection circuits being connected with neurons blocks, and the oscillatory neural network unit further comprises the control block controlling the synapse block and the neuron blocks to implement the trained oscillatory neural network.
- each neuron block comprises a phase calculator and a phase controlled oscillator.
- the control block is further adapted to determine the state of the oscillatory neural network in presence of the inputted image, the state being chosen among a failure to converge, an incorrect recognition and a correct recognition.
- the controlling unit is adapted to initialize the oscillatory neural network and to synchronize the oscillatory neural network with the other elements of the pattern learning and recognition device in cooperation with the control block.
- the oscillatory neural network is a fully connected neural network.
- the training unit is adapted to implement a Hebbian learning rule or a Storkey learning rule.
- the programmable architecture is a field-programmable gate array.
- the processor is an ARM processor.

The specification also describes a pattern learning and recognition system comprising an image receiver adapted to receive an image wherein a pattern is to be recognized, a pattern display adapted to display an information relative to the output of the oscillatory neural network unit in presence of the image, and a pattern learning and recognition device as previously described.

According to further aspects of this pattern learning and recognition system, which are advantageous but not compulsory, the pattern learning and recognition system might incorporate one or several of the following features, taken in any technically admissible combination:

- the pattern display is a set of light-emitting diodes or a screen.
- the training unit is adapted to learn the weights of the oscillatory neural network to obtain learnt weights, the pattern learning and recognition device comprising a memory unit, the memory unit being adapted to store the weight learnt and being another part of the programmable architecture.
- the training unit is adapted to train the oscillatory neural network based on images received by the image receiver.
- the training unit is adapted to train the oscillatory neural network based on the output of the oscillatory neural network unit.

The specification also relates to a method for learning and recognizing a pattern, the method being implemented by a pattern learning and recognition device comprising a training unit, the training unit being a part of a processor, an oscillatory neural network unit, the oscillatory neural network unit being a part of a programmable architecture, notably a field-programmable gate array, a controlling unit, the controlling unit being another part of the programmable architecture, the processor and the programmable architecture forming a system-on-chip, the method comprising training an oscillatory neural network, implementing a trained oscillatory neural network, outputting a pattern when an image is inputted and controlling the oscillatory neural network unit and the training unit.

BRIEF DESCRIPTION OF THE DRAWINGS

The invention will be better understood on the basis of the following description which is given in correspondence with the annexed FIGURE and as an illustrative example, without restricting the object of the invention. Such FIGURE, named FIG. 1, is a schematic view of a pattern recognition system notably comprising neuron blocks.

DETAILED DESCRIPTION OF SOME EMBODIMENTS

FIG. 1 represents a pattern recognition system 10.

The pattern learning and recognition system 10 is a system adapted to receive, learn and recognize an incoming pattern and output the recognized pattern.

For instance, the pattern learning and recognition system is adapted to recognize an animal in a photo or a number/letter in a text. The animal, the number or the letter are examples of pattern.

For this, the pattern learning and recognition system 10 comprises an image receiver 12, a pattern display 14 and a pattern learning and recognition device 16.

The image receiver 12 is adapted to receive an image in which a pattern is to be recognized.

For instance, the image receiver 12 is a camera.

In such case, for instance, an image is shown in the field of view of the image receiver 12 and the latter records the image with the pattern to be recognized.

The pattern display 14 is adapted to display the recognized pattern.

As an example, the pattern display 14 is a set of light-emitting diodes (also named with the abbreviation LED).

According to another embodiment, the pattern display 14 is a screen.

The pattern learning and recognition device 16 is adapted to carry out the pattern learning and recognition tasks on the pattern to be recognized.

In the present example, the pattern learning and recognition device 16 comprises an oscillatory neural network unit 18, a controlling unit 20, a training unit 22 and a memory unit 23.

The oscillatory neural network unit 18 is implementing a trained oscillatory neural network to output a pattern when an image is inputted in said trained oscillatory neural network.

The abbreviation ONN is often used to designate the oscillatory neural network.

A neural network is a mathematical function made of a set of neurons linked by synapses.

A synaptic weight is associated with each synapse. It is often a real number, which takes both positive and negative values. In some cases, synaptic weight is a complex number.

A neural network is an oscillatory neural network when the neurons are oscillators.

Unlike any other neural network such as the most commonly used spiking neural network, in oscillatory neural networks, the information is computed in the frequency domain rather than the time domain. By describing neurons as oscillators, it is the phase difference between oscillating neurons that enables to encode information rather than in voltage amplitude versus time as in spiking neural network.

This means that oscillatory neural networks are coupled oscillators with distinctive phase differences. The output is encoded on the phase differences to represent either in-phase (i.e. logic value 0) or out-of-phase (i.e. logic value 1).

Distinctive phase relations are obtained by the synchronization of the coupling network dynamics. Phase differences correspond to the memorized patterns in the network.

In the case of FIG. 1, it should also be noted that in the oscillatory neural network, each neuron is connected to each of the other neurons, so that the oscillatory neural network is fully-connected neural network.

In the present case, the pattern learning and recognition device 16 is a system-on-chip 24.

A system-on-chip is a circuit that integrates all the elements of the calculator in a single substrate or microchip. The abbreviation SoC is generally used to designate such kind of circuit.

The system-on-chip 24 comprises a programmable architecture 26 and a processor 28.

In the example of FIG. 1, the programmable architecture 26 is a FPGA.

The programmable architecture 26 will thus be named FPGA 26 hereinafter.

The abbreviation FPGA stands for “field-programmable gate array”. It designates an integrated circuit designed to be configured after manufacturing-hence the term “field-programmable”. The configuration of the FPGA is generally specified using a hardware description language (HDL).

In the present configuration, the FPGA 26 comprises the oscillatory neural network unit 18, the memory unit 23, and the controlling unit 20.

This means that the oscillatory neural network unit 18 is a part of a field-programmable gate array 26, the memory unit 23 is another part of field-programmable gate array 26, and the controlling unit 20 is another part of field-programmable gate array 26, the processor 28 and the FPGA 26 forming a system-on-chip 24.

As the oscillatory neural network is implemented in the FPGA 26, the oscillatory neural network is digitally implemented. This means that the oscillatory neural network is a digital oscillatory neural network.

The oscillatory neural network unit 18 comprises a synapse block 30, a neuron blocks 32 and a control block 34.

Functionally, synapse contain weights and compute each neuron input. Synapse are implemented as a synapse block 30 comprising a set of memories 36 and interconnection circuits 38.

The memories 36 are arranged in an array.

In FIG. 1, the array comprises five columns and five rows, but this FIG. 1 is only illustrative and any numbers of columns and rows can be considered for the memories 36. The number of columns and rows depends on the number of neurons in the network, the memory has as much rows and as much columns as the number of neurons.

Synaptic weights are encoded inside in a respective memory 36.

Each interconnection circuit 38 is adapted to generate the input signal to i-th neuron as:

$$in_i = \text{sign}\left(\sum_j w_{ij} - \sum_k w_{ik}\right)$$

Wherein:

j extends to the neurons with output signal of j-th neuron $out_j=1$ and k extends to the neurons with output signal of k-th neuron $out_k=0$.

For this, each interconnection circuit 38 is linked on the end to the memories 36 and on the other end to the neuron blocks 32.

As for the array of memories 36, the fact that five neuron blocks 32 and five interconnection circuits 38 are represented in FIG. 1 should not be construed as limitative numbers.

Each neuron block 32 implements a respective neuron of the oscillatory neural network.

Functionally, neurons are phase-changed oscillators. Each neuron computes the phase difference between the present oscillating input and output signals to align the output oscillations in-phase with the input ones.

As apparent on FIG. 1, a neuron block 32 comprises a phase calculator 40, and, a phase-controlled oscillator 42.

The neuron block 32 operates as follows.

The process starts with initialization of the output signal phase Phase_output.

Then, the phase calculator 40 calculates the phase difference between the oscillation input and output.

Then, the phase-controlled oscillator 42 applies the calculated phase difference to the oscillation output.

The phase-controlled oscillator 42 creates oscillation on the neuron output from phase difference information.

The neuron phase is updated aligning the output oscillation phase with the input oscillation phase.

The control block 34 is adapted to control the synapse block 30 and the neuron blocks 32 to implement the oscillatory neural network.

For this, the control block 34 is adapted to control and monitor oscillatory neural network computation.

According to the described example, the control block 34 is adapted to carry out three tasks, which correspond respectively to the sub-block system_status (first sub-block 46), the sub-block initialization (second sub-block 48) and the sub-block frequency_divider (third sub-block 50).

The control block 34 is adapted to trigger the initialization phase with the second sub-block 46.

For this, the control block 34 processes to apply input phase state to the neurons.

The control block 34 is further adapted to generate a clock adapted to ensure the oscillatory neural network operation, the generated clock having a period inferior to the period of the clock clk, notably as a specific example inferior to half of the period of the clock.

Such ratio of periods can be obtained by the third sub-block 50. This third sub-block 50 is a frequency divider.

The control block 34 is also adapted to generate informative signals about the state of the Oscillatory Neural Network computation. This means that the control block 34 monitors neuron activity with the first sub-block 46.

In the present example, the state is chosen among a failure to converge, an incorrect recognition and a correct recognition.

A failure to converge is detected here by the fact that no stable phase state is reached after a predefined time interval.

An incorrect recognition corresponds to a pattern that was not used by the training unit 22 to train the oscillatory neural network.

So as to interact with other elements, the oscillatory neural network unit 18 comprises four inputs for collecting the necessary operating signals and the third inputs for emitting necessary operating signals.

The first and second inputs are adapted to receive signals enabling to synchronize the digital oscillatory neural network with the other elements of the pattern learning and recognition system 10.

In the present example, the first input receives clk while the second input receives reset.

The third and fourth inputs are adapted to receive signals enabling to initialize the oscillatory neural network unit 18.

For instance, the third input is adapted to receive a load signal. The load signal is simply named load in what follows.

The fourth input is adapted to receive serially the initial phase state of the oscillatory neural network. This signal is simply named phase_input in what follows.

The first output is adapted to output a signal triggering the end of computation of the oscillatory neural network unit 18, named comp_end. The second output is adapted to output a signal about the convergence of the oscillatory neural network unit 18, called convergence and the third output is adapted to output phase_output, this signal corresponding to the phase information of the recognized pattern.

The controlling device 20 comprises a clock unit 52, an input unit 54, a memory control unit 55, a display control unit 56 and an oscillatory neural network control unit 58.

The clock unit 52 generates the clock signal clk and sends it to the oscillatory neural network unit 18.

The input unit 54 receives the images from the image receiver 12 and convert the image pixels in phase that corresponds to the signal phase_input.

The memory control unit 55 is adapted to control the memory unit 23.

More precisely, the memory control unit 55 is adapted to read the content of the memory unit 23 and send this content to the oscillatory neural network unit 18.

The display control unit 56 is adapted to control the pattern display 14 to display an information relative to the output of the oscillatory neural network unit in presence of the image (the output being a failure to converge, an incorrect recognition and a correct recognition).

The oscillatory neural network control unit 58 controls the operating of the oscillatory neural network unit 18 as will be explained hereinafter.

More precisely, the oscillatory neural network control unit 58 is adapted to control the oscillatory neural network unit 18, initialize it and interpret output signals of the oscillatory neural network unit 18.

For this, the oscillatory neural network control unit 58 is adapted to provide the oscillatory neural network unit 18 with two signals, which are load and phase_in.

The training unit 22 is adapted to train the oscillatory neural network.

Training the oscillatory neural network is finding appropriate weight values for the oscillatory neural network for a given application (here finding the pattern).

The training unit 22 is adapted to train the oscillatory neural network after receiving by the image receiver 12.

Alternatively or in complement, the training unit 22 is adapted to the oscillatory neural network depending on the oscillatory neural network output.

This is why in FIG. 1, the training unit 22 is linked to both the input unit 54 and the oscillatory neural network control unit 58.

The training unit 22 is a part of the processor 28.

According to the illustrated example, the processor 28 is an ARM processor. The abbreviation ARM stands for "Advanced RISC Machines" and designates a family of reduced instruction set computing (RISC) architectures for computer processors.

The memory unit 23 is adapted to store the trained weights obtained by the training unit 22.

When the training unit 22 updates the weights, the memory unit 23 is adapted to store the updated weights.

The communication is carried out by Advanced extensible Interface (AXI) communication protocol.

The memory unit 23 is another part of the FPGA 26.

The operating of the pattern learning and recognition device 16 is now described in reference to an example of carrying out of a method for recognizing a pattern.

Such method comprises a training phase and a use phase.

During the training phase, the training unit 22 trains the oscillatory neural network.

The training phase comprises a reading step, a calculating step and a sending step.

During the reading step, the training unit 22 reads the training patterns and store them, so that the training patterns are named stored patterns.

Then, the training unit 22 calculates synaptic weights during training from stored patterns.

For this, the training unit 22 uses learning rule algorithms to calculate training patterns associated weights.

It exists multiple training algorithms (learning rules) to calculate synaptic weights.

In the present case, the training unit 22 implements a Hebbian learning rule or a Storkey learning rule.

Hebbian learning rules are rules enabling to determine how to alter the weights between model neurons.

In accordance with the Hebb model from which the Hebbian learning rules derive, the weight between two neurons increases if the two neurons activate simultaneously, and reduces if the two neurons activate separately.

In the present case, the Hebbian learning rules consists in computing the following formula:

$$c_{i,j} = \frac{1}{n}\sum_{k=1}^{m} \xi_i^k \overline{\xi_i^k}$$

In the previous expression, $c_{i,j}$ designates the Hebbian coefficient between a neuron i and another neuron j. A Hebbian coefficient can also be named as a connection matrix element by reference to the matrix that represents the Hebbian coefficients.

Such Hebbian coefficient corresponds to the fact that if two oscillators should oscillate in-phase such as $$\xi_i^k = \xi_j^k,$$

then their phase difference is zero, and if $$\xi_i^k = -\xi_j^k$$

this means that the two oscillators are out-of-phase.

By contrast, Storkey learning rule can be defined as:

$$\omega_{ij}^{v} = \omega_{ij}^{v-1} + \frac{1}{N}\xi_i^v\xi_j^v - \frac{1}{N}\xi_i^v h_{ji}^v - \frac{1}{N}h_{ij}^v\xi_j^v$$

Wherein:

$$h_{ij}^{v} = \sum_{k=1,k\neq i,j}^{N} \omega_{ij}^{\mu-1}\xi_k^{\mu}$$

$$\omega_{ij}^{0} = 0 \forall\, i, j$$

and $h_{ij}$ is a form of local field at neuron i.

The calculated weights are stored by the memory unit 23.

During the sending step, the memory control unit 55 sends the calculated weight to the oscillatory neural network unit 18, so that the oscillatory neural network unit 18 has access to their value and can perform inference, that is carry out the use phase.

The use phase corresponds to the recognizing phase, an image comprising a pattern to recognize is sent to the pattern learning and recognition device 16 and the pattern learning and recognition device 16 tries to identify the pattern.

Such recognition is carried out by a proper management of the signals, which is now described.

During the use phase, the signal load is activated_to start initialization of the digital oscillatory neural network.

All neuron's phases are initialized.

When the initialization is over, the digital oscillatory neural network starts a computation stage.

The end of the computation stage triggers an activation of the signal comp_end.

Several cases are then possible.

When the digital oscillatory neural network fails to converge, the signal convergence is disactivated.

This results in the display controller sending a specific command to the display, the specific command corresponding to an error.

The display switches on a specific set of light-emitting diodes to indicate that no stored pattern has been recognized.

In case of convergence, the signal convergence is activated and the output of the digital oscillatory neural network is tested.

When the output of the digital oscillatory neural network corresponds to a stored pattern, the signal state is set to Stored_Pattern and sent by the display controller to the pattern display 14.

The display controller displays said stored pattern.

When the output of the digital oscillatory neural network does not correspond to a stored pattern, the signal state is not set to Stored_Pattern.

There again, this results in the display control unit 56 sending the specific command corresponding to an error to the pattern display 14 and the pattern display 14 switching on the specific set of light-emitting diodes to indicate that no stored pattern has been recognized.

In variant, the specific set of light-emitting diodes differs when the error is linked to an absence of convergence of the digital oscillatory neural network and when the error is due to the fact that the recognized pattern is not part of the stored patterns.

The previously described steps enabling to control the digital oscillatory neural network can be represented by the following pseudocode:

```
Initialization:
  load = 0
  phase_input = reset
  Image = input image
Process:
Forall image do
    load ← 1
    phase_input ← image
  if steady = 1 then
        phase_input ← reset
    if convergence = 0 then
        send error to display controller
    else
      if state = Stored_Pattern then
        send Stored_Pattern to display controller
      else
        send error to display controller
    end
  end
end
```

As a specific example of implementation of each previously described elements, the digital ONN is implemented into a development board from Digilent company. The development board is the Zybo-Z7. It has many communication ports, memory spaces, user interaction tools, and a Xilinx Zynq-7000 SoC. The SoC integrates a dual-core ARM Cortex-A9 processor with Xilinx 7-series FPGA.

The software used is the Xilinx's Vivado Design Suite 2018.2. It integrates the Verilog RTL description of the oscillatory neural network into a larger VHDL architecture. Inputs and output of the architecture are provided by the development board. A push-button is used for the reset of the system, switches to initialize the oscillatory neural network state and LEDs to display the output state of the oscillatory neural network. The system clock of 125 MHZ is provided directly from the Zybo-Z7 board.

Thus, the present pattern learning and recognition device 16 is adapted to implement a digital oscillatory neural network with on-chip training capabilities.

Such approach is advantageous as it allows computing the weights online and on-chip rather than computing the weights off-chip and transferring them on-chip.

In addition, this facilitates the training of the oscillatory neural network since the training is achieved by merely presenting patterns to the pattern learning and recognition system 10, instead of using additional tools.

Since the processor 28 is generally natively present in the system-on-chip, there is no need to use an additional resource to implement the training of the digital oscillatory neural network.

It should also be pointed out that a programmable architecture, such as a FPGA, is a physical implementation providing with low-cost, easily reprogrammable, power-efficient and high-speed performances.

In other words, the proposed pattern learning and recognition device 16 is an efficient implementation of a pattern learning and recognition device based on oscillatory neural networks.

It can also be noted that the oscillatory neural network unit 18 operates as an associative memory. An associative memory is used to perform pattern recognition functions (image, sound, etc.). The patterns are learned by the network thanks to an algorithm during the learning phase. Once learned, the patterns are then recognized when inputs representing the noisy patterns are presented to the network. There are therefore two steps necessary for pattern recognition, pattern learning, and inference, which consists of presenting a noisy input to the network, and letting the network calculate the corresponding output. The learning step determines the weight values used to configure the synapses of the network.

There are a multitude of learning algorithms. Some are said to be supervised and require outside intervention, while others are said to be unsupervised and require no outside intervention. In the case of associative memory functions, the algorithms used are mostly unsupervised. There are a multitude of different unsupervised learning algorithms, which make it possible to obtain more or less high inference accuracy. These algorithms are mainly characterized by two parameters: locality and incrementality. The locality induces that the update of the weight value of a synapse depends only on the activation of the neurons at the two ends of this synapse. The incrementality induces that the algorithm can learn each pattern independently of each other, which makes it possible to learn them one after the other. The proposed device 16 is by construction compatible with any incremental unsupervised learning algorithm.

The device 16 consists in using a SoC (System on chip, system on chip) containing a part of programmable logic (FPGA), as well as a processor 28. The processor 28 is used to implement the learning algorithm while the programmable logic part is used to implement the ONN.

The inputs of the device 16 include the network input data as well as a learn enable signal. The output of the device 16 represents the output data of the oscillatory neural network unit 18. When the learning signal is activated, the input data is sent to the processor which calculates the weights of the synapses according to the defined learning algorithm. The weights are then transmitted from the processor 28 to the programmable logic part. In the developed system, the transmission of the weights is done through an AXI communication. Once the weights are received by the programmable logic part, they are used to configure the synapses of the oscillatory neural network unit 18. When the learning signal is disabled, the input data is directly transmitted to the logic part and processed by the oscillatory neural network unit 18 for inference.

This pattern learning and recognition device 16 is thus an efficient implementation of a pattern recognition device based on oscillatory neural networks. This renders such device 16 well adapted for edge AI applications.

The invention claimed is:

1. A pattern learning and recognition device comprising:

a training unit adapted to train an oscillatory neural network, the training unit being a part of a processor, wherein the training unit is configured to calculate synaptic weights by implementing a learning algorithm on the processor, an oscillatory neural network unit, the oscillatory neural network unit implementing a trained oscillatory neural network being adapted to output a pattern when an image is inputted, the oscillatory neural network unit being a part of a programmable architecture, wherein the oscillatory neural network unit is digitally implemented on the programmable architecture, and a controlling unit adapted to control the oscillatory neural network unit and the training unit, the controlling unit being another part of the programmable architecture, the processor and the programmable architecture forming a system-on-chip, wherein the programmable architecture is a field-programmable gate array and the processor is an Advanced Reduced Instruction Set Computing Machines processor, wherein the calculated synaptic weights are transmitted from the processor to the oscillatory neural network unit on the programmable architecture.

2. The pattern learning and recognition device according to claim 1, wherein the oscillatory neural network unit comprises:

neuron blocks, each neuron block implementing a respective neuron of the oscillatory neural network, a synapse block, the synapse block being a set of memories and interconnection circuits, each memory storing a respective weight and the interconnection circuits being connected with neurons blocks, and the control block controlling the synapse block and the neuron blocks to implement the trained oscillatory neural network.

3. The pattern learning and recognition device according to claim 2, wherein each neuron block comprises a phase calculator and a phase controlled oscillator.

4. The pattern learning and recognition device according to claim 2, wherein the control block is further adapted to determine the state of the oscillatory neural network in presence of the inputted image, the state being chosen among a failure to converge, an incorrect recognition and a correct recognition.

5. The pattern learning and recognition device according to claim 2, wherein the controlling unit is adapted to initialize the oscillatory neural network and to synchronize the oscillatory neural network with the other elements of the pattern learning and recognition device in cooperation with the control block.

6. The pattern learning and recognition device according to claim 1, wherein the oscillatory neural network is a fully connected neural network.

7. The pattern learning and recognition device according to claim 1, wherein the training unit is adapted to implement a Hebbian learning rule or a Storkey learning rule.

8. A pattern learning and recognition system comprising:

an image receiver adapted to receive an image wherein a pattern is to be recognized, a pattern display adapted to display an information relative to the output of the oscillatory neural network unit in presence of the image, and a pattern learning and recognition device according to claim 1.

9. The pattern learning and recognition system according to claim 8, wherein the pattern display is a set of light-emitting diodes or a screen.

10. The pattern learning and recognition system according to claim 8, wherein the training unit is adapted to learn the weights of the oscillatory neural network to obtain learnt weights, the pattern learning and recognition device comprising a memory unit, the memory unit being adapted to store the weight learnt and being another part of the programmable architecture.

11. The pattern learning and recognition system according to claim 8, wherein the training unit is adapted to train the oscillatory neural network based on images received by the image receiver.

12. The pattern learning and recognition system according to claim 8, wherein the training unit is adapted to train the oscillatory neural network based on the output of the oscillatory neural network unit.

13. A method for learning and recognizing a pattern, the method being implemented by a pattern learning and recognition device comprising:

a training unit, the training unit being a part of a processor, wherein the training unit is configured to calculate synaptic weights by implementing a learning algorithm on the processor, an oscillatory neural network unit, the oscillatory neural network unit being a part of a programmable architecture, notably a field-programmable gate array, wherein the oscillatory neural network unit is digitally implemented on the programmable architecture,—a controlling unit, the controlling unit being another part of the programmable architecture, the processor and the programmable architecture forming a system-on-chip, the method comprising:

training an oscillatory neural network, implementing a trained oscillatory neural network, outputting a pattern when an image is inputted, and controlling the oscillatory neural network unit and the training unit, wherein the programmable architecture is a field-programmable gate array and the processor is an Advanced Reduced Instruction Set Computing Machines processor, wherein the calculated synaptic weights are transmitted from the processor to the oscillatory neural network unit on the programmable architecture.

* * * * *